United States Patent [19]

Kinoshita

[11] Patent Number: 4,593,577
[45] Date of Patent: Jun. 10, 1986

[54] AUTOMOTIVE STEERING COLUMN TILT ADJUSTING DEVICE

[75] Inventor: Satoshi Kinoshita, Hamana, Japan

[73] Assignees: Nissan Motor Company, Limited, Yokohama; Fuji Kiko Company, Limited, Tokyo, both of Japan

[21] Appl. No.: 494,573

[22] Filed: May 13, 1983

[51] Int. Cl.[4] .......................... B62D 1/18; G05G 5/24
[52] U.S. Cl. ...................................... 74/493; 74/541; 280/775; 403/95
[58] Field of Search .................. 74/493, 540, 541; 280/775; 403/95

[56] References Cited

U.S. PATENT DOCUMENTS

| | | | |
|---|---|---|---|
| 4,078,448 | 3/1978 | Naka | 74/493 |
| 4,102,218 | 7/1978 | Naka et al. | 74/493 |
| 4,300,407 | 11/1981 | Kopf | 74/493 |
| 4,495,834 | 1/1985 | Bauer et al. | 280/775 X |

FOREIGN PATENT DOCUMENTS

| | | |
|---|---|---|
| 0050999 | 5/1982 | European Pat. Off. . |
| 3206328 | 10/1982 | Fed. Rep. of Germany . |
| 0000435 | of 1903 | United Kingdom ................ 74/493 |

Primary Examiner—Allan D. Herrmann
Attorney, Agent, or Firm—Schwartz, Jeffery, Schwaab, Mack, Blumenthal & Evans

[57] ABSTRACT

A steering column tilt adjusting device allows the tilt of the upper steering column to be adjusted with finer resolution than is normally possible with the same latching hardware. In this case, sets of interengageable teeth of constant pitch are employed. One set of teeth is on a latch plate biased toward latching engagement but releasable by a manually operated lever. The other set of teeth is on a plate linked to the tiltable portion of the steering column. The linkage is such that the plate moves through a smaller angle of displacement than does the movable portion of the steering column. Thus, the teeth on the plate can be relatively coarse while allowing fine adjustment of the steering column position.

22 Claims, 14 Drawing Figures

AUTOMOTIVE STEERING COLUMN TILT ADJUSTING DEVICE

BACKGROUND OF THE INVENTION

The present invention relates generally to an automotive steering column tilt adjusting device which allows the steering column to be tilted to match the position of the driver. More specifically, the invention relates to a tilt adjusting device allowing delicate adjustment with a smaller incremental angle.

Conventionally, one kind of tilt adjusting device secures a steering column assembly at a selected steering column angular position by way of engagement between two sets of matching teeth. One set of teeth is formed on an edge of a movable section of the steering column and the other set of teeth is formed on a stationary section of the steering column.

In such a conventional tilt adjusting device, the increment of the steering column angle is determined by the pitch of the teeth. Therefore, to obtain a smaller incremental angle, it is necessary to reduce the pitch of the teeth or to increase the distance between the pivot of the movable part and the teeth thereof in relation to the distance between the pivot and the steering wheel. In the former case, the smaller teeth may be insufficiently strong. Regarding the latter case, since the space within the vehicle for the steering column assembly is strictly limited, it is not practical to significantly enlarge the size.

SUMMARY OF THE INVENTION

Therefore, it is an object of the present invention to provide a tilt adjusting device for an automotive steering column assembly which allows satisfactorily precise steering column angle adjustment without reducing the pitch of the teeth and without changing substantially the size of the steering column assembly.

Another object of the present invention is to provide a tilt adjusting device as described above which also permits the steering column to be temporarily moved and then returned to the previously adjusted position without having to be re-adjusted.

According to the present invention, a movable toothed plate is attached to a movable steering column section via a linkage and is rotatable about a pivot axis displaced from the pivot axis of the movable steering column section. The pivot axes of the movable teeth and the movable steering column section are so arranged that the movable teeth move through a larger angle than the movable steering column section as the movable steering column section is adjusted to a desired angle.

According to one embodiment of the invention, a tilt adjusting device for an automotive steering column assembly comprises a steering column and tube assembly, the assembly including an upper movable section and a lower stationary section connected for rotation together. The assembly further includes a stationary bracket for fixedly securing the lower stationary section to a vehicle body, and a movable bracket connected to the upper movable section for movement therewith. The movable bracket is pivotable with respect to the stationary brackets. A latching mechanism including interengageable members is provided. Each of the interengageable member has interengagement means for latching the movable bracket at a selected angular position with respect to the stationary bracket. A first member is connected to the movable bracket for movement therewith. The assembly further including a manually operated lever for releasing interengagement of the first and second members for permitting pivotal movement of the movable bracket, and a pivotting means for pivotably supporting the movable bracket and the first member for relative movement with respect to each other. The pivot means includes a first pivot allowing pivotal movement of the movable bracket and a second pivot allowing pivotal movement of the first member, the second pivot being located closer to the interengagement means of the first member than the first pivot is to the interengagement means of the first member.

BRIEF DESCRIPTION OF THE DRAWINGS

The present invention will be understood more fully from the detailed description given herebelow and from the accompanying drawings of the preferred embodiments of the invention, which, however, should not be taken as limitative to the invention but for elucidation and explanation only.

In the drawings.

DESCRIPTION OF THE PREFERRED EMBODIMENTS

Figure 1:
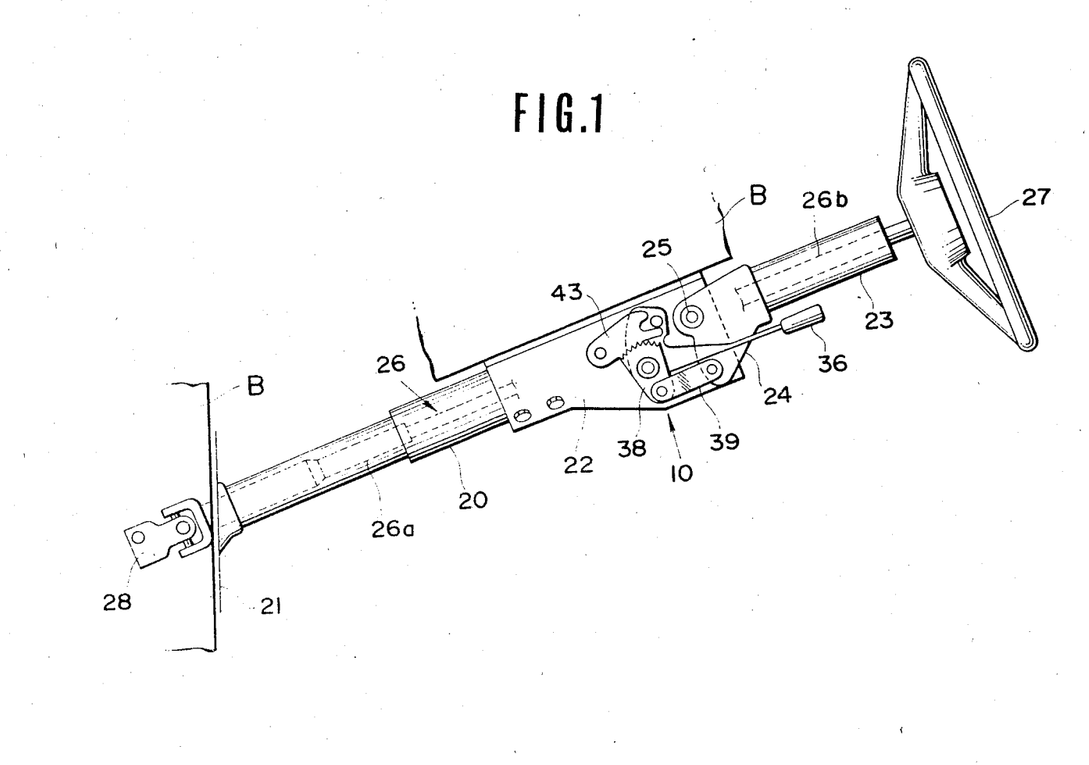
FIG. 1 is an elevation of an automotive steering column assembly including the first embodiment of a tilt adjusting device according to the present invention.

Referring now to the drawings, particularly to FIG. 1, a steering column assembly generally comprises an upper steering column tube 23 and a lower steering column tube 20. The lower steering column tube 20 has a dash bracket 21 at the lower end remote from the upper steering column tube. The dash bracket 21 is secured to a vehicle body B. A stationary bracket 22 is secured to both the other end of the lower steering column tube 20, and the vehicle body B, specifically a vehicle instrument panel. Thus, the lower steering column 20 is fixedly secured to the vehicle body B by the dash bracket 21 and the stationary bracket 22.

The upper steering column tube 23 is formed with an integral movable bracket 24. The movable bracket 24 is essentially channel-shaped in cross-section and pivots about a pivot bolt 25 in the stationary bracket 22. The movable bracket 24 is associated with a tilt adjusting mechanism 10 operated by way of a tilt adjusting lever 36.

The upper steering column tube 23 rotatably receives an upper steering column shaft 26b to which the steering wheel 27 is secured. On the other hand, the other steering column tube 20 rotatably receives a lower steering column shaft 26a connected to a steering mechanism (not shown) via a universal joint 28. The upper and lower steering column shafts 26b and 26a are connected to each other via a universal joint (26c in FIG. 6) for transmission of rotational steering force.

Figure 2:
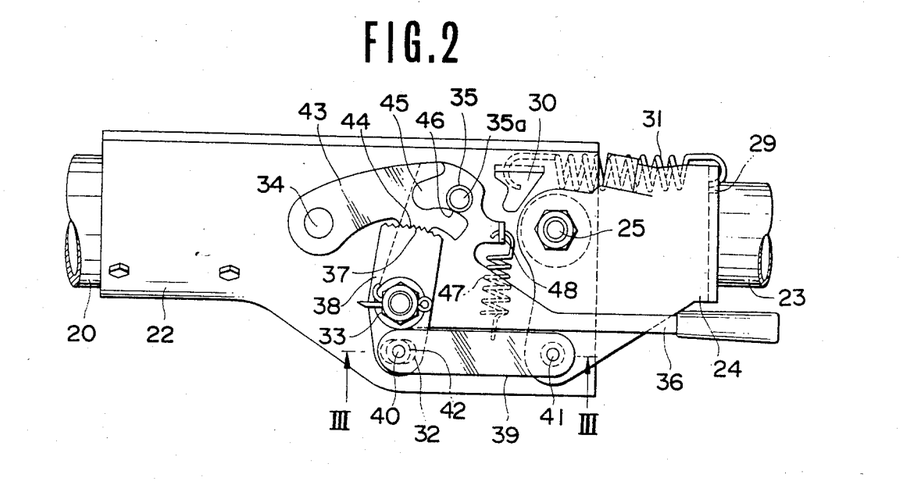
FIG. 2 is an enlarged elevation of the tilt adjusting device of FIG. 1.
Figure 3:
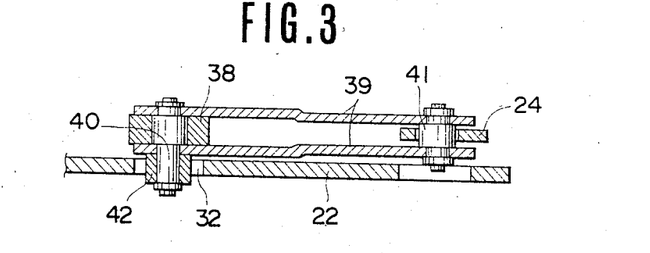
FIG. 3 shows a section taken along line III—III of FIG. 2.

As shown in FIGS. 2 and 3, the movable bracket 24 engages one end of a coil spring 31, the other end of which engages a hook 30 projecting from the stationary bracket 22. The coil spring 31 thus resiliently biases the movable bracket 24 counterclockwise in FIG. 2. In addition, an elongated opening 32 is formed in the stationary bracket 22 to receive a roller 42 which rotates about a pin 40 projecting from a pair of linkage levers 39. As shown most clearly in FIG. 3, the linkage levers 39 are connected to a pivotable plate 38 with teeth 37 along one edge, which toothed plate 38 is free to pivot about a pivot pin 33 projecting from the stationary bracket 22. The linkage levers 39 are, in turn, pivotably connected to the movable bracket 24 via a connector pin 41. As shown in FIG. 2, the linkage levers 39 engage one end of a coil spring 47, the other end of which engages a hook 48 extending from the tilt adjusting lever 36.

The teeth 37 of the toothed plate 38 oppose teeth 44 formed along part of the edge of a latch plate 43. The latch plate 43 is free to pivot about a pivot pin 34 projecting from the stationary bracket 22 and is also formed with a rounded recess 45 with a sloping cam surface 46.

The tilt adjusting lever 36 is provided with a roller 35 free to pivot about an axle 35a projecting from the tilt adjusting lever. The roller 35 opposes the recess 45 and is positioned so as to be able to remain in contact with the cam surface 46 throughout its range of movement. In the position illustrated in FIG. 2, the tilt adjusting lever 36 is normally biased by the coil spring 47 in the clockwise direction of FIG. 2 to urge the roller 35 onto the cam surface 46. On the other hand, the movable bracket 24 is biased by the coil spring 31 in the counterclockwise direction of FIG. 2. In this position, the latch plate 43 is biased in the clockwise direction about the pivot pin 34 so as to establish engagement between its teeth 44 and the teeth 37 of the toothed plate 38. The engagement between the teeth 37 and the latch teeth 44 holds the toothed plate 38 in the position illustrated in FIG. 2 and thus holds the linkage lever 39 in the shown position. As a result, the movable bracket 24 of the upper steering column tube 23 is similarly held in the position illustrated.

To adjust the tilt of the steering column assembly and thereby adjust the height of the steering wheel 27, the tile adjusting lever 36 is moved in the counterclockwise direction of FIG. 2. The roller 35 is thus moved along the cam surface 46 of the latch plate 43 to the recess 45. Due to the actuating force applied to the tilt adjusting lever 36, the latch plate 43 is pivotted counterclockwise about the pivot pin 34 to release the latch teeth 44 from engagement with the teeth 37 of the toothed plate 38.

In accordance with the counterclockwise movement of the tilt adjusting lever 36, the linkage lever 39 is pulled upwardly by the spring force of the coil spring 47 to cause it to pivot about the pin 40 in the counterclockwise direction. This allows the movable bracket 24 to pivot counterclockwise due to the spring force of the coil spring 31. That is, in response to the operation of the tilt adjusting lever 36, the movable bracket 24 and the upper steering column tube 23 are moved to the uppermost position due to the spring force of the coil spring 31.

From the uppermost position, the movable bracket 24 with the steering column tube 23 can be manually pivotted in the clockwise direction to lower the steering wheel to the most suitable steering wheel position. After the above steering wheel position adjustment, in other words after adjustment of the tilt of the upper steering column tube 26b, the tilt adjusting lever 36 is released from the counterclockwise force so that the tilt adjusting lever 36 returns to its initial position due to the spring force of the coil spring 47. The roller 35 thus moves out of the recess 45 along the cam surface 46 to bias the latch plate 43 towards the toothed plate 38 so that the latching teeth 44 engage the teeth 37. As a result, the movable bracket 24 and the upper steering column 23 are secured in the adjusted angular position.

Figure 4:
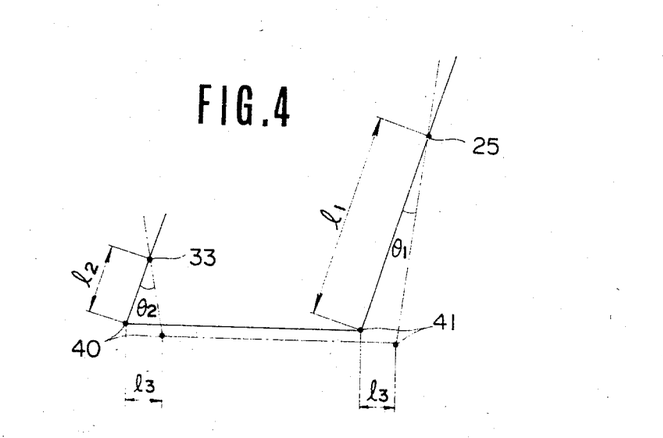
FIG. 4 is an explanatory diagram of the angular movements of about the axes of the movable bracket and the toothed plate of the tilt adjusting device of the first embodiment.

FIG. 4 is an explanatory diagram of the geometry of the movement of the movable bracket 24, the linkage lever 39 and the toothed plate 38. As is apparent from FIG. 4, when the movable bracket 24 pivots about the pivot bolt 25 through an angle $\theta_1$, the displacement at the connector pin 41 is a fixed distance $l_3$. Therefore, the pivot pin 40 is also displaced by the distance $l_3$. If the distance between the connector pin 41 and the pivot bolt 25 is $l_1$ and the distance between the pivot 33 and the pivot pin 40 are given as $l_1$ and $l_2$ respectively, then the angle $\theta_2$ through which the toothed plate 38 pivots $l_1/l_2$ times larger than the angle $\theta_1$.

Therefore, as will be appreciated, according to the shown embodiment, the pivotal angle of the toothed plate 38 is greater than the corresponding pivot angle of the movable bracket 24. As a result, even if the teeth 38 and 44 are of a conventional pitch, the minimum angular increment of the steering column assembly tilt can be sufficiently small to allow delicate adjustment.

Figure 5:
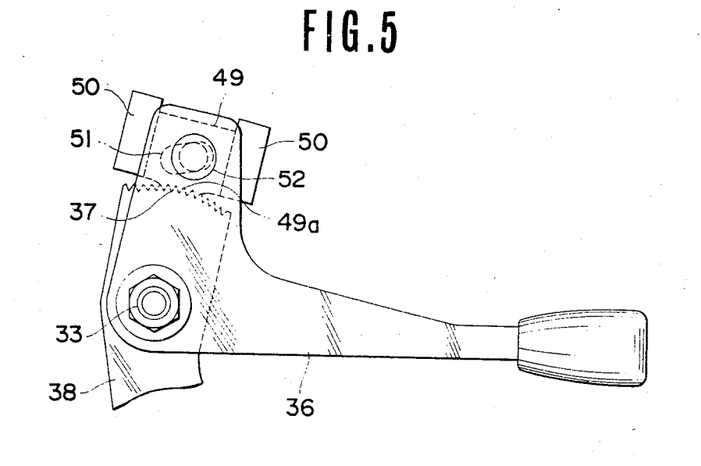
FIG. 5 is a fragmentary elevation of a modification of the first embodiment.

FIG. 5 shows a modification of the foregoing first embodiment of steering column tilt adjusting mechanism according to the present invention. In this modification, the latch plate 49 with teeth 44 is bracketed by a pair of guide members 50 and is formed with an elongated opening 51. As in the foregoing first embodiment, the tilt adjusting lever 36 is free to pivot about the pivot pin 33 projecting from the stationary bracket, as is the toothed plate 38 with the teeth 37.

The guide members 50 protrude from the stationary bracket and allow reciprocating, essentially up-and-down movement of the latch plate 49. A projecting pin 52 formed on the tilt adjusting lever 36 engages the elongated opening 51. The axis of the elongated opening 51 is inclined with respect to the axis of motion of the latch member 49 in order to cause reciprocal movement of the latch plate 49 in response to movement of the tilt adjusting lever 36.

Even though the movement of the latch plate 49 is different from that of the latch plate 43 in the foregoing first embodiment, the tilt adjusting function to be carried out by this modification is essentially the same as that of the foregoing first embodiment.

Figure 6:
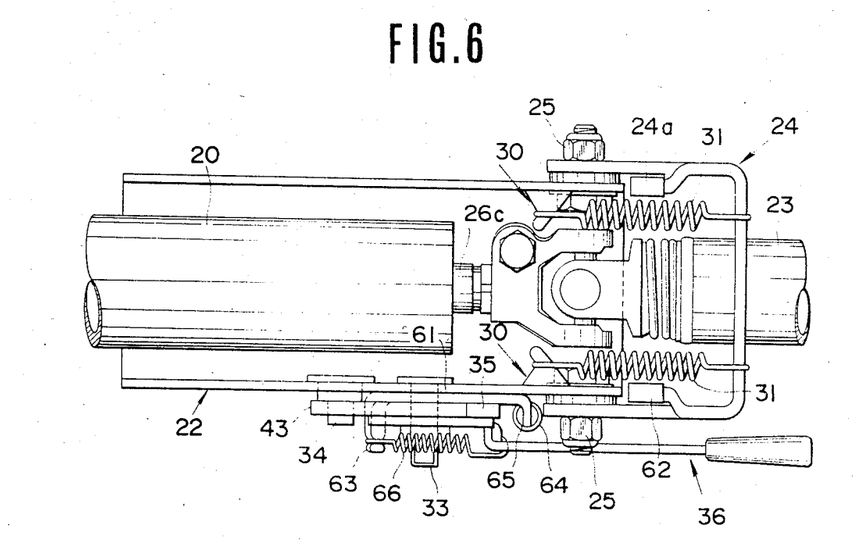
FIG. 6 is a plan view of another modification of the tilt adjusting device of the first embodiment.
Figure 7:
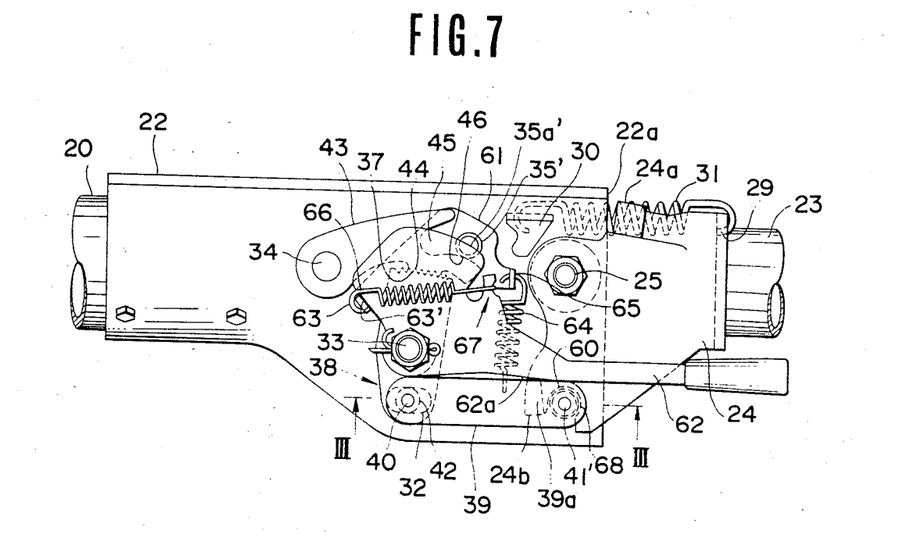
FIG. 7 is an elevation of the tilt adjusting device of FIG. 6.
Figure 8:
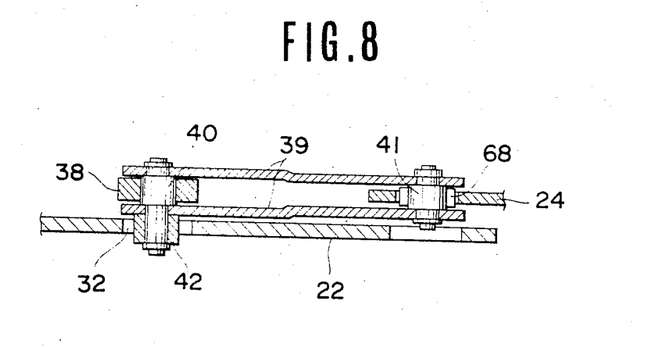
FIG. 8 shows a section taken along line VIII—VIII of FIG. 7.

FIGS. 6 to 8 show another modification of the foregoing first embodiment of the steering column tilt adjusting mechanism according to the present invention. Referring to FIG. 7 this modification, a locking plate 61 is pivotably supported by the pivot pin 33. A roller 35' is rotatably secured to the locking plate 61 for rotation about the roller axle 35a'. As with the roller 35 of the foregoing first embodiment, the roller 35' normally contacts the cam surface 46 of the latching plate 44 and can engage the recess 45 when the tilt adjusting lever 36 is actuated. The locking plate 61 also has a bent strip 63. The bent strip 63 opposes a point 63' along the edge of the tilt adjusting lever 36. A coil spring 66 is stretched between the bent strip portion 63 and a hook 67 projecting from the tilt adjusting lever 36 in order to bias the bent strip portion 63 towards the point 63' of the tilt adjusting lever 36 and establish contact therebetween.

The locking plate 61 has a hook 65 to which one end of a coil spring 64 is attached. The other end of the coil spring 64 is attached to the linkage plate 39. The linkage plate 39 has a projection 41' which rotatably supports a roller 68. The roller 68 is adapted to engage a recess 60 formed in the lower edge of the movable bracket 24.

On the other hand, the upper edge of the linkage lever 39 opposes the lower edge 62a of the tilt adjusting lever 36 so that the linkage lever 39 will be depressed downward when the tilt adjusting lever 36 is moved clockwise.

The roller 35' supported by the locking lever 61 normally contacts the cam surface 46 of the latch plate 43 to cause the latch teeth 44 to engage the teeth 37 of the toothed plate 38. As a result, movement of the linkage lever 39 is restricted. The linkage lever 39 is also biased upwardly by the coil spring 64 to ensure engagement between the roller 68 and the recess 60. Since movement of the linkage lever 39 is restricted due to the interengagement of the latch plate 43 and the toothed plate 38, movement of the movable bracket 24 and the upper steering column 23 is also restricted. Therefore, in the position illustrated in FIG. 7, the movable bracket 24 is held securely in place.

As in the foregoing first embodiment, the tilt adjustment can be performed by moving the tilt adjusting lever 36 counterclockwise. In response to counterclockwise movement of the tilt adjusting lever 36, the bent strip 63 of the locking plate 61 is driven to pivot the locking plate in the counterclockwise direction. According to this movement of the locking lever 61, the roller 35' moves along the cam surface 46 to the recess 45. The roller 35', once within the recess 45, urges the latch plate 43 in the counterclockwise direction to release the engagement between the latch teeth 44 to the latch teeth 37 of the toothed plate 38.

At the same time, due to the counterclockwise movement of the locking plate 61, the linkage lever 39 is pulled upwards to pivot counterclockwise about the pin 40 by the spring force of the coil spring 64. Due to the upward movement of the linkage lever, the movable bracket 24 and the upper steering column 23 are moved counterclockwise to be positioned at the uppermost position. Thereafter, a suitable angular position can be selected by gradually lowering the upper steering column 23 and the movable bracket 24 from the uppermost position.

When a suitable steering column tilt is determined, the tilt adjusting lever 36 is returned to the initial position by clockwise rotation thereof. In response, the locking plate 61 is moved clockwise so that the roller 35' returns to the cam surface 46 of the latch plate 43. The latch plate 43 is thus moved so that the latch teeth 44 engage the teeth 37 of the toothed plate 38. Due to the interengagement of the latching plate 43 and the toothed plate 38, the linkage lever 39 and movable bracket 24 are held securely in the selected steering column angular position.

During this tilt adjusting operation, the universal joint 26c interposed between the upper and lower steering column shafts 26b and 26a permits variation of the angle of the upper steering column shaft with respect to the lower steering column shaft.

In addition to the tilt-adjusting capability described above, this embodiment of the present invention also allows the steering column to be moved to its uppermost position and then returned to the previously selected position without having to be readjusted, as described below.

When the steering wheel must be moved, for example when the driver of the vehicle gets out of the vehicle or for some other reason, the tilt adjusting lever 36 is moved counterclockwise to release the steering column. Due to the clockwise movement of the tilt adjusting lever 36, the linkage lever 39 is depressed in the clockwise direction against the spring force of the coil spring 64 to release the roller 68 from the recess 60 of the movable bracket 24. As a result, the movable bracket 24 becomes free from the restriction due to the interengagement of the latch plate 43 and the toothed plate 38. The movable bracket 24 is then moved counterclockwise by the spring force of the coil spring 31. The counterclockwise movement of the movable bracket 24 is stopped when a stopper strip 24a formed on the upper edge of the movable member comes into contact with to a stopper edge 22a of the stationary bracket 22.

When the tilt adjusting lever 36 is moved clockwise, the point 63' is released from the bent strip 63 so that the engagement between the latching plate 43 and the toothed plate 38 remains unaffected.

To return the movable bracket to the previous position, the movable bracket 24 is forced downwards against the force of the spring 31. During this clockwise movement of the movable bracket, a curved surface 24b of the movable bracket contacts the roller 68 to depress the linkage lever 39 downwardly. Therefore, the linkage lever 39 rotates about the pin 40 against the spring force of the coil spring 64. Due to the resilient force of the coil spring 64, the roller 68 moves along the curved surface 24a and enters the recess 60, thus locking the steering column back into the previously selected position.

Figure 9:
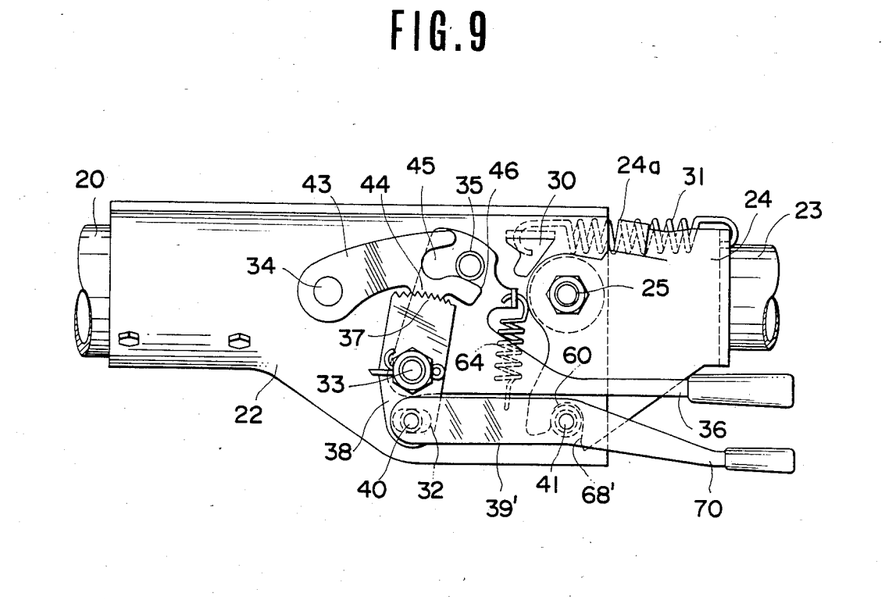
FIG. 9 is an elevation of a further modification of the tilt adjusting device of the first embodiment.

FIG. 9 shows a further modification of the foregoing embodiment of FIGS. 6 to 8 which employs a tilt adjusting lever and a separate lever for temporarily moving the upper steering column upwards. In this modification, the lever 70 allowing temporary upward movement of the upper steering column 23 forms an extension of the linkage lever 39'. The tilt adjusting lever 36 has essentially the same shape as that of the first embodiment of FIG. 1 and is actuable independently of the lever 70. The linkage lever 39' rotatably supports the roller 68' near the end proximal to the lever 70. The roller 68' can rotate about the pin 41 and engage a recess 60 formed in the lower edge of the movable bracket 24.

As will be appreciated, the tilt adjusting operation is substantially identical to that illustrated with respect to the foregoing first embodiment. On the other hand, to temporarily move the upper steering column 23 and the movable bracket, the lever 70 is moved in the clockwise direction to release the roller 68' from engagement with the recess 60. As a result, the movable bracket 24 and the upper steering column 23 pivot in the counterclockwise direction due to the spring force of the coil spring 31. At this time, the pin 40 allows rotation of the linkage lever 39' independently of the toothed plate 38. Therefore, the toothed plate 38 remains in engagement with the latch plate 43.

As in the foregoing embodiment of FIGS. 6 to 8, returning the steering column to its previous position from the uppermost position is performed by depressing the movable bracket 24 and the upper steering column downwardly. During downward movement of the movable bracket, the curved surface 24b contacts the roller 68' and depresses the linkage lever 29 to rotate clockwise about the pin 40. According to the downward movement of the movable bracket 24, the roller 68' moves along the surface 24b to engage with the recess 60 at the position previously selected.

FIGS. 10 to 13 show the second embodiment of the tilt adjusting mechanism for the steering column assembly according to the present invention. As in the foregoing first embodiment, the lower steering column 120 has a dash bracket 121 through which the lower end of the lower steering column 120 is secured to the vehicle body B'. The upper end of the lower steering column 120 is, in turn, secured by the stationary bracket 122. Thus, the lower steering column 122 is fixedly secured on the vehicle body by the stationary bracket 122 and the dash bracket 121. The movable bracket 124 at the lower end of the upper steering column 123 is pivotably connected to the stationary bracket 122 via the pivot bolt 125.

Figure 10:
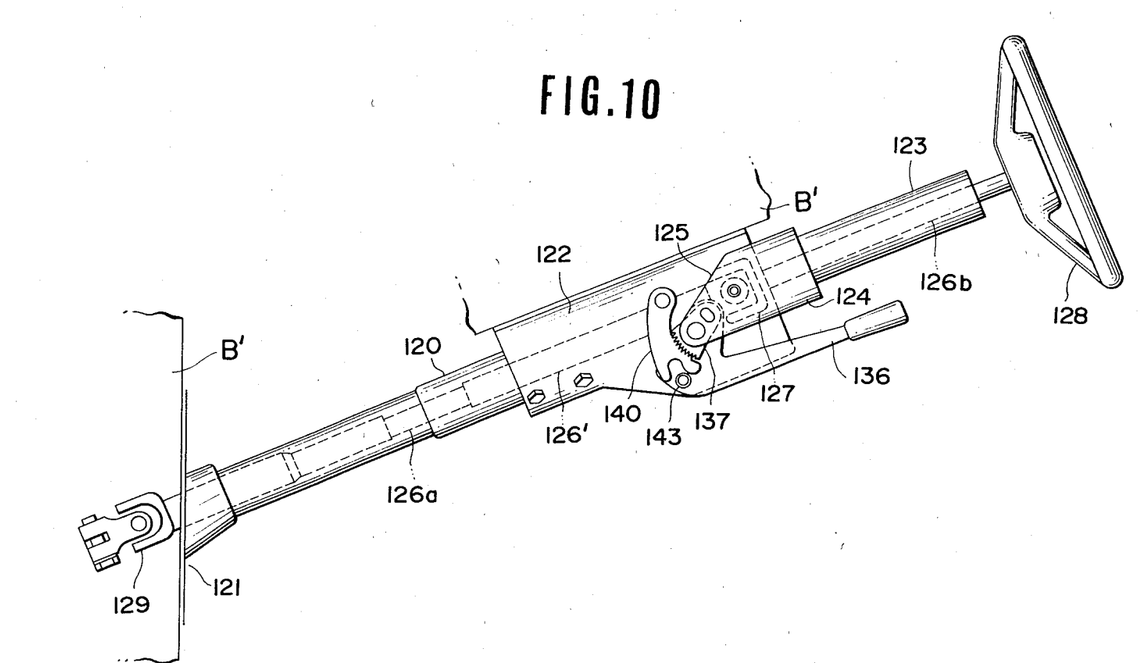
FIG. 10 is an elevation of the steering column assembly including the second embodiment of the tilt adjusting device according to the present invention.
Figure 11:
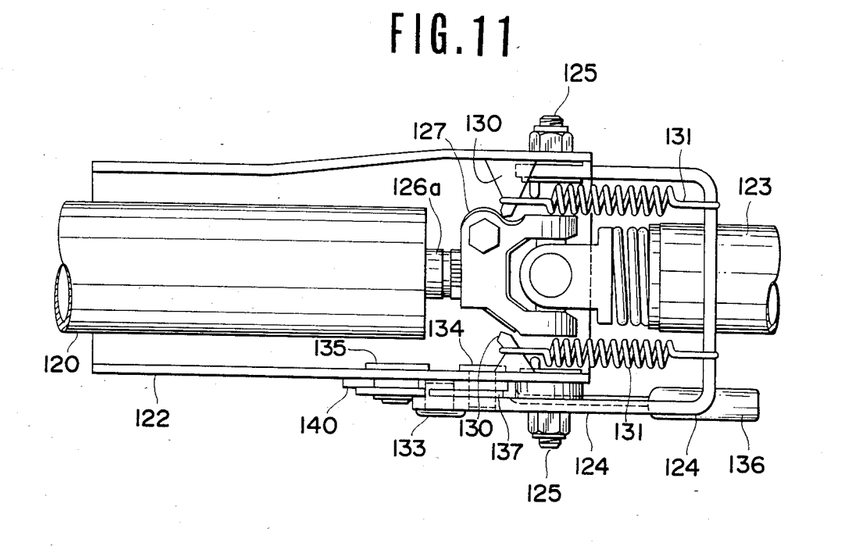
FIG. 11 is an enlarged plan view of the second embodiment of the tilt adjusting device of FIG. 10.

The upper and lower steering column shafts 126a and 126b are housed in the upper and lower steering column tubes 120 and 124 for rotation therein. The universal joint 126' is interposed between the upper and lower steering column shafts 126b and 126a for transmission of the rotational steering force and to allow adjustment of the tilt of the upper steering column shaft 126b with respect to the lower steering column shaft 126a. The upper steering column shaft 126b supports a steering wheel 128 for steering operation. On the other hand, the lower end of the lower steering column shaft 126a is connected to the universal joint 129 to transmit the steering force to a steering mechanism (not shown).

Figure 12:
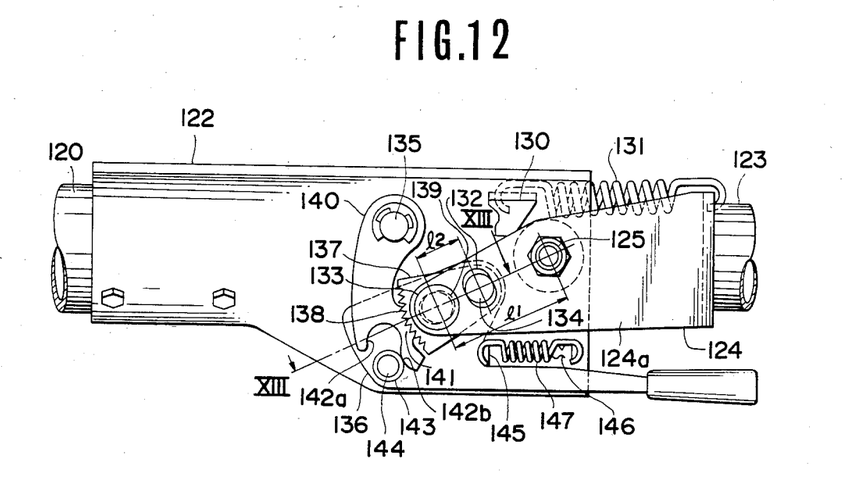
FIG. 12 is an enlarged elevation of the tilt adjusting device of FIG. 11.
Figure 13:
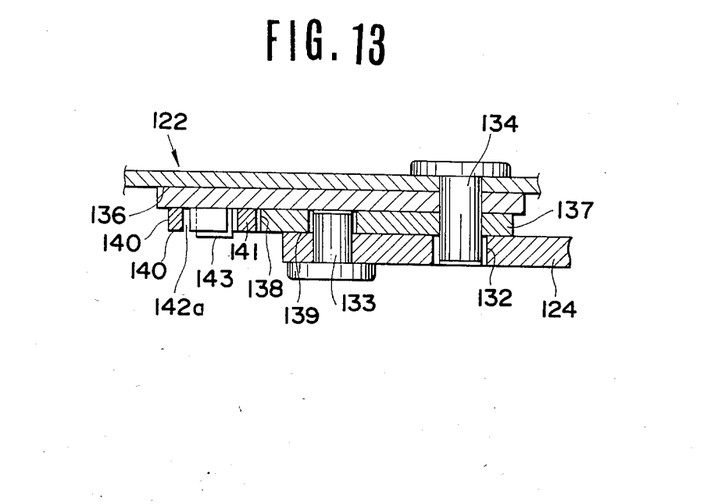
FIG. 13 shows a section taken along line XIII—XIII of FIG. 12.

The movable bracket 124 is biased in the counterclockwise direction in FIG. 12 to be normally urged upwardly by a coil spring 131, one end of which engages the movable bracket and the other end of which engages a hook 130 projecting from the stationary bracket 122.

The tilt adjusting lever 136 is pivotally mounted on the stationary bracket 122 via a pivot pin 133. A plate 137 with teeth 138 is also pivotably supported by the pivot pin 133. The toothed plate 137 has a pin 134 projecting therefrom. The pin 134 movably engages an elongated opening 132 formed in the movable bracket 124. Similarly, the pivot pin 133 is free to move along an elongated opening 139. The longitudinal axis of elongated opening 139 is essentially perpendicular to the longitudinal axis of the elongated opening 132. The teeth 138 of the toothed plate 137 oppose the teeth 141 of a latch plate 140 which is free to pivot about a pivot 135. The latch plate 140 is formed with a recess 142a and a cam surface 142b extending along one edge of the recess. A roller 143 rotatably about an axle 144 projecting from a tilt adjusting lever 136 normally remains in contact with the cam surface 142b.

The tilt adjusting lever 136 is biased in the counterclockwise direction by a coil spring 147, one end of which engages a hook portion 145 extending from the tilt adjusting lever and the other end engages a hook 146 projecting from the stationary bracket 122.

In the normal position, the tilt adjusting lever 136 is biased in the counterclockwise direction to drive the cam surface 142b of the latch plate 140 towards the toothed plate 137 for interengagement of the teeth 138 and 141. As a result, the movement of the movable bracket 124 about the pivot bolt 125 is restricted despite the resilient force provided by the coil spring 131.

To adjust the tilt of the steering column assembly, the tilt adjusting lever 136 is move in the clockwise direction in FIG. 12 to release the roller 143 from the cam surface 142b. Due to the rotational movement of the tilt adjusting lever 136, the roller 143 enters the recess 142a and urges the latch plate 140 to release the teeth 141 from engagement with the teeth 138 of the toothed plate 137. The toothed plate 137, thus, can rotate about the pin 133, thereby causing the pin 134 to move along the elongated opening 132 of the movable bracket 124.

At this time, the movable bracket 124 moves in the counterclockwise direction along with the upper steering column tube 123 due to the spring force of the coil spring 131. The toothed plate 137 can remain in place while the movable bracket 124 moves upwards since the pin 134 is free to move relative to the elongated opening 139.

After the movable bracket 124 and the upper steering column tube 123 reach their uppermost position, the movable bracket 124 can be manually forced downward while holding the tilt adjusting lever in the actuate position to select a suitable tilt position. When the steering column assembly is suitably positioned, the tilt adjusting lever 136 can be released to return to its initial position due to the force of the coil spring 147. During this return movement of the tilt adjusting lever 136, the roller 143 again comes into again contact with the cam surface 142b of the latch plate 140 to establish engagement between the sets of teeth 138 and 141.

During this steering column assembly tilt adjusting operation, the pin-and-opening engagement between the pin 133 and opening 139 and the pin 134 and the opening 132 serves to magnify the angular displacement of the toothed plate 137 in relation to the angular displacement of the movable bracket according to the ratio of the distances $l_1$ and $l_2$ in FIG. 12. That is, since the toothed plate 137 is pivoted about the pivot pin 134 and the rotational movement of the movable bracket 124 is transmitted by way of the pin 133, the angular displacement of the teeth 138 is $l_1/l_2$ times larger than that of the pin 133. Therefore, even though the teeth has a conventional pitch, the minimum angular increment is sufficiently fine to allow precise adjustment.

Figure 14:
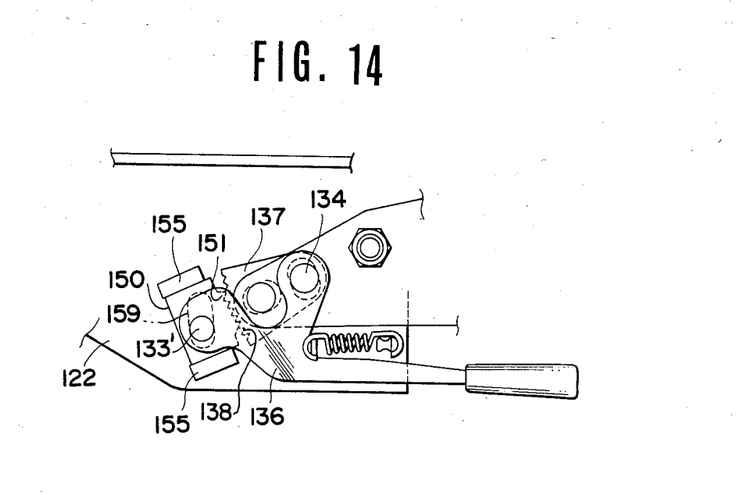
FIG. 14 is an elevation of a modification of the second embodiment of the tilt adjusting device.

FIG. 14 shows a modification of the foregoing second embodiment of the tilt adjusting device according to the present invention. In this modification, the latch plate 150 is bracketed by a pair of guides 155 for reciprocal movement toward and away from the teeth 138 of the toothed plate 137. The latch plate 150 is formed with an elongated opening 159 with an axis oblique to the axis of the latch plate. A pin 133' projecting from the tilt adjusting lever engages the elongated opening.

In this structure, releasing the engagement of the teeth 138 and 151 is performed by moving the pin along the elongated opening 159 of the latch plate 150. In this modification, the tilt adjustment can be performed in essentially the same manner as set forth in the second embodiment.

What is claimed is:

1. A tilt adjusting device for an automotive steering column comprising:
said steering column including an upper movable section and a lower stationary section;
a stationary bracket for fixedly securing said lower stationary section onto a vehicle body;
a movable bracket connected to said upper movable section for movement therewith and pivotable with respect to said stationary bracket;
a latching mechanism comprising interengageable first and second members, each having engagement means, for latching said movable bracket at a selected angular position with respect to said stationary bracket;
a manually operated lever for releasing the interengagement of said first and second members to permit pivotal movement of said movable bracket; and
means for co-operating said first member with said movable bracket for pivotally moving said first member according to the pivotal movement of said movable bracket, said co-operating means adapted to cause larger angular displacement of said first member for each pivotal movement of said movable bracket than the corresponding angular displacement of said movable bracket.

2. The device as set forth in claim 1, wherein said manually operated lever has unlatching means for releasing the interengagement of said first and second members, further comprising a bias spring to urge the movable bracket upwardly, whereby said movable bracket moves towards a predetermined uppermost position when the interengagement of said first and second members is released.

3. The device as set forth in claim 1, which further comprises pivotting means including a first pivot means for pivotting said movable bracket with respect to said stationary bracket, and a second pivot means for pivotting said first member according to pivotal movement of said movable bracket.

4. The device as set forth in claim 3, wherein said co-operating means comprises a linkage connecting said first member and said movable bracket for pivotal movement together, and said linkage is pivotally attached to said first member and to said movable bracket via third and fourth pivots respectively, and the distance between said third pivot and said second pivot is shorter than the distance between said fourth pivot and said first pivot.

5. The device as set forth in claim 4, which further comprises a disconnecting means for temporarily releasing said movable bracket from said selected angular position while maintaining interengagement of said members so as to temporarily permit upward movement of said movable bracket.

6. The device as set forth in claim 5, wherein said disconnecting means is adapted to be actuated by said manually operated lever.

7. The device as set forth in claim 6, wherein said disconnecting means is adapted to be actuated when said manually operated lever is operated in a first direction opposite a second direction in which said level is to be actuated in order to adjust the tilt.

8. The device as set forth in claim 2, wherein said unlatching means is adapted to move said second member to release the interengagement between said members when said manually operated lever is operated.

9. The device as set forth in claim 1, wherein said co-operating means comprises a pin projecting from one of said first member and said movable bracket and an opening formed in the other of said first member and said movable bracket for receiving said pin, thereby forming a pin-and-opening engagement allowing relative displacement of said movable bracket with respect to said first members.

10. The device as set forth in claim 9, which further comprises a disconnecting means for temporarily releasing said movable bracket from said latching mechanism for temporarily allowing said movable bracket to move upwards while maintaining the interengagement between said members.

11. A tilt adjusting device for an automotive steering column comprising:
said steering column having an upper movable component and a lower stationary component, said lower stationary component being adapted to be fixedly secured to a vehicle body and said upper movable component being pivotably connected to said lower stationary component for pivotal movement about a first pivot for adjusting the angle of tilt of said upper movable component in relation to the orientation of said lower stationary component;
a locking means for locking said upper movable component at a selected angular position with respect to said lower stationary component, said locking means including first and second members interengageable with each other for establishing locking engagement between said upper and lower components, said first member connected to said upper movable component for pivotal movement according to pivotal movement of said movable component;
a manually operable means associated with said locking means for operating said locking means to release said locking engagement and thereby to allow said upper movable component to move relative to said lower stationary component for adjusting the tilt of said upper movable component; and
a second pivot for pivotably supporting said first member, said second pivot being located relative to said first pivot so as to cause larger angular displacement of said first member for each pivotal movement of said upper component than the corresponding angular displacement of said upper movable component.

12. The device as set forth in claim 11, which further comprises a linkage means for connecting said upper movable component and said first member and for moving said first member according to the movement of said upper movable component and for restricting movement of said upper movable component when said locking means establishes said locking engagement.

13. The device as set forth in claim 11, which further comprises a connecting means for connecting said upper movable component and said first member and for moving said first member according to the movement of said upper movable component and for restricting the movement of said upper movable component when said locking means establishes said locking engagement, said connecting means including a connector pin projecting from one of said first member and said upper movable component and an opening formed in the other of said first member and said upper movable component for receiving said connector pin.

14. The device as set forth in claim 13, which further comprises means for allowing temporary movement of said upper movable component relative to said first member while with maintaining said locking engagement of said locking means.

15. The device as set forth in claim 13, wherein said upper movable component is normally biased upwards by a resilient member.

16. The device as set forth in claim 15, which further comprises means for allowing temporary upward movement of said upper movable component relative to said first member while maintaining said locking engagement of said locking means at the selected angular position of said upper movable component.

17. The device as set forth in claim 16, wherein said means for allowing temporary upward movement of said upper movable component is associated with said manually operable means to be actuated when said manually operable means is operated in the direction opposite to the direction in which it is operable for tilt adjustment.

18. The device as set forth in claim 16, wherein said means for allowing temporary upward movement of said upper movable component is associated with a second manually operable means provided independently of the previously mentioned manually operative means for releasing said locking engagement of said locking means.

19. The device as set forth in claim 12, wherein said linkage is pivotably connected to said upper movable component via a third pivot and to said first member via a fourth pivot, and wherein the distance between said third pivot and said first pivot is longer than the distance between said second and fourth pivots, thereby causing larger angular displacement of said first member according to corresponding angular displacement of said upper movable component.

20. A tilt adjusting device for an automotive steering column comprising:

a stationary column forming a part of said steering column;

a movable column forming a part of said steering column and pivotable relative to said stationary column about a first pivot;

a stationary bracket fixedly connecting said stationary column to a vehicle body;

a movable bracket connected to said movable column and pivotable with said movable column, said movable bracket being pivotable relative to said stationary bracket about a second pivot;

a latching mechanism including normally interengagable first and second members, said second member being pivotably secured to said stationary bracket and said first member being pivotable about a third pivot;

a linkage interposed between said movable bracket and said first member, said linkage having a fourth pivot, about which said first member and said linkage cause angular displacement relative to each other, at one end and a fifth pivot about which said linkage and said movable bracket causing relative angular displacement relative to each other, and linkage causing pivotal movement of said first member about said fourth pivot according to pivotal movement of said movable bracket at an angle greater than the angular displacement of said movable bracket with said movable column about said second pivot; and a manual handle associated with said linkage for causing downward pivotal movement of said linkage to disengage said first member for allowing pivotal movement of said movable bracket for tilt adjustment.

21. The device as set forth in claim 20, wherein the lever length between said second pivot to said fifth pivot is greater than the lever length between said third pivot to said fourth pivot thereby causing greater angular displacement for said first member than that of said movable bracket.

22. The device as set forth in claim 21, wherein said second member of said latching means is pivotable about a sixth pivot and associated with said manual handle to be pivotally actuated for disengagement from said first member when said manual handle is upwardly pivoted.

* * * * *